Jan. 13, 1959

W. J. TULL ET AL 2,869,118

NAVIGATION SYSTEM

Filed May 20, 1947

Inventor
WILLIAM J. TULL
FRANK N. GILLETTE

By

Attorney

Inventor
WILLIAM J. TULL
FRANK N. GILLETTE

Inventor
WILLIAM J. TULL
FRANK N. GILLETTE

United States Patent Office 2,869,118
Patented Jan. 13, 1959

2,869,118

NAVIGATION SYSTEM

William J. Tull and Frank N. Gillette, Pleasantville, N. Y., assignors to General Precision Laboratory Incorporated, a corporation of New York Application May 20, 1947, Serial No. 749,184

19 Claims. (Cl. 343—9)

Our invention relates to a navigation system for determining the ground speed and drift angle of a vehicle with respect to the earth over which it is traveling. While in describing this device, particular reference will be made hereinafter to the conditions obtaining in the case of aircraft, it will be apparent that the principles involved are not limited thereto and that the system is equally applicable to other modes of vehicular travel, such as navigation by ships and the like.

One object of our invention is to provide an improved system utilizing the phenomena known as Doppler effect for determining the drift angle of a craft moving over the surface of the earth.

Thus in accordance with our invention high frequency waves are transmitted from one body toward another body which scatters or reflects the waves in all directions. The waves so reflected from the second body are received on the first body from a plurality of directions, a selected portion of the energy received from each direction is compared with the energy of that received from the other and the resultant comparison is utilized to so orient directional receiving means that the bisector of the angle between the directions of reception indicates the true direction of travel.

Another object of our invention is to provide an improved system for determining the relative speed of one body with respect to another wherein all the equipment utilized for this purpose is located on one of the bodies.

When waves are transmitted from one body to another body which is moving relative thereto, the waves reflected by the second body and received back at the first body will differ in frequency from that of the transmitted waves by reason of the Doppler effect. The reflected waves in any practical system, however, will consist not of a single frequency but of a band or spectrum of frequencies and a mere determination of the difference between the frequencies of the transmitted waves and the reflected waves will not constitute an accurate determination of the relative speeds of the two bodies.

In the system of our invention an accurate indication of relative speed of the bodies is accomplished by determining the difference in frequency between the transmitted waves and a selected portion of the spectrum of reflected waves, the selection of a portion of the received spectrum of frequencies to give accurate determination of relative speeds being accomplished by the advantageous use of filter and local oscillator means.

A further object of our invention is the provision of means for utilizing the Doppler effect to directly indicate the latitude and longitude of a moving vehicle.

A still further object of our invention is to provide means whereby the correct course to a selected destination is automatically indicated.

A still further object of our invention is to provide a means for indicating the estimated time necessary to reach a selected destination.

These and other objects and advantages of our invention will be apparent from the following specification when taken with the accompanying drawings in which.

When an airplane is flying in a still air mass, it heads in a direction of its longitudinal axis and flies through the air mass in this direction. If a wave of known frequency is transmitted from the airplane and received on an antenna which has directional characteristics and is pointed in the direction of travel and parallel to the earth's surface, the frequency of the waves received after reflection will differ from that of the transmitted wave by an amount which is proportional to the speed of the airplane. This difference may be expressed by the formula $$\Delta F = f_0 \times \frac{2V}{C}$$

where $f_0$ is a transmitted frequency $\Delta F$ is the difference between the transmitted and received frequency known as the Doppler shift in frequency, C is the velocity of electromatic waves in space and V is the velocity of the vehicle in which the transmitter and receiver are located.

Figure 1:
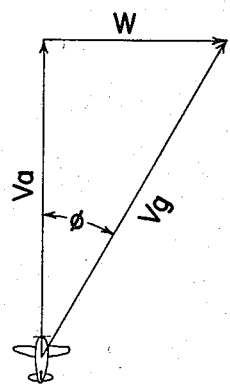
Figure 1 is a representation of the vector relations involved when an aircraft is flying through an air mass in motion.

When however, the air mass is in motion, that is when there is a wind, the aircraft heads not in its direction of travel but in a direction at an angle thereto, determined by the vector addition of the velocity of the vehicle in the air mass and the velocity of the wind. This relationship is illustrated in Fig. 1, wherein the vector $V_G$ indicates the velocity of the vehicle with respect to ground, $V_a$ indicates the velocity of the vehicle with respect to the air and W the wind velocity. It will be seen in this case, that although the aircraft is heading in a direction of the vector $V_a$ it is in effect traveling in a direction at an angle thereto represented by the angle $\phi$. Under such circumstances if the reflected wave is received on a directional antenna pointed along the longitudinal axis of the aircraft, the Doppler shift of frequency will be less than that expressed by the equation above by an amount equal to the cosine of the angle $\phi$.

Under these conditions, therefore, the Doppler relationship is expressed by the formula $$\Delta F = f_0 \times \frac{2V}{C} \times \cos \phi$$

Figure 2:
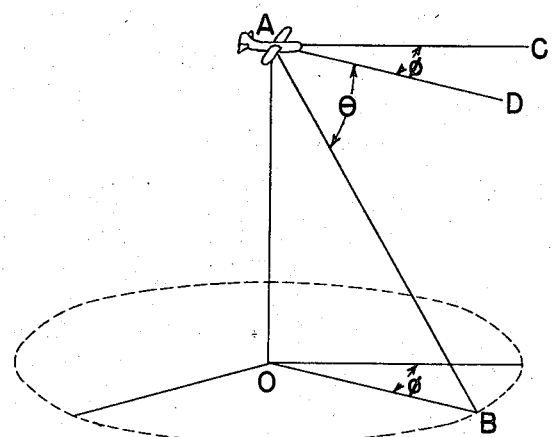
Figure 2 is a representation of the three dimensional angular relationships resulting when a plane flying above the earth's surface transmits a wave and receives its reflection from the earth's surface.

In practical applications in airplanes, insufficient signal is reflected back to the receiver from a direction which is in a plane parallel with the earth's surface. It is therefore necessary in a practical system, to direct the receiving antenna at an angle with respect to this plane so that waves reflected from the earth's surface may be received with sufficient signal strength at the plane. Such a system is geometrically illustrated in Fig. 2. In this figure, the plane at A is assumed to have a heading along the line AC but due to wind is in reality traveling in a direction along the line AD at an angle $\phi$ from the heading of the aircraft. The directional receiving antenna is directed at an angle $\theta$ with respect to the horizontal thereby receiving signals reflected from the earth's surface along a line AB. Under these circumstances, a second angular relationship becomes involved and the shift in Doppler frequency is now expressed by the formula $$\Delta F = f_0 \times \frac{2V}{C} \times \cos \phi \times \cos \theta$$

It will be seen therefore, that the Doppler shift in frequency varies both as a cosine of the angle between the ground track and direction of propagation and the cosine of the elevation angle measured between the horizontal and the direction of propagation.

Figure 3:
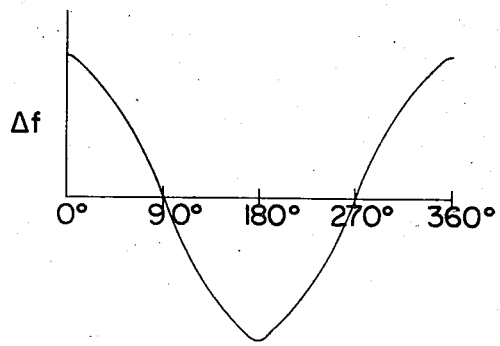
Figure 3 is a graph illustrating change in Doppler frequency shift as the receiving antenna is rotated through a 360° path.

If the angle of elevation is held constant and the receiving antenna is rotated about a vertical axis, varying the angle $\phi$ through 360° the Doppler shift in frequency variation such as illustrated in Figure 3 is obtained in which 0° is taken as the direction of the ground track. That is, the Doppler shift is greatest when the receiving antenna is pointed in a direction of ground track or 180° therefrom and is zero at 90 and 270 degrees.

When using antennas of any practical design, a band or spectrum of frequencies rather than a single monochromatic frequency as illustrated in Fig. 3 is received for the reason that such an antenna receives waves from a finite area rather than a single ray from a single point.

Figure 4:
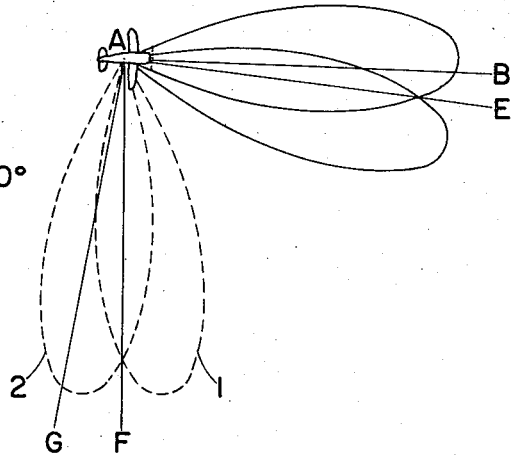
Figure 4 is a diagrammatic representation in plan view of the pattern of reception of a pair of directional receiving antennas when rotated about the vertical.
Figure 5:
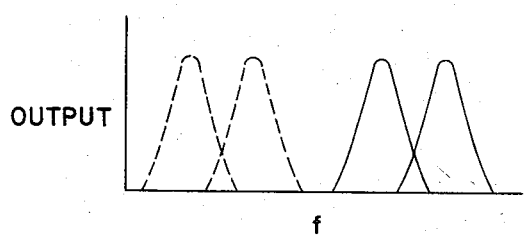
Figure 5 is an illustration of the Doppler frequency spectra received by the directional antennas, the receptivity patterns of which are illustrated in Figure 4.

This relationship is illustrated in the representation of Fig. 4 incidental to the illustration of the simultaneous pattern of each of two directional receiving antennas. The solid and dotted lines indicate the patterns for different positions. The antennas are mounted on a single assemblage in such a fashion that their directions of maximum sensitivity are at a fixed angle with respect to each other but the mount itself is capable of rotation at a fixed angle with respect to the vertical axis of the plane. Assuming the true ground track of the plane to be in a direction AB and the bisector of the receptivity patterns of the two directional receiving antennas to be in a direction AE, overlapping frequency spectra as indicated by the solid lines in Fig. 5 will be received. If the antenna assembly is rotated so that signals are received in a direction indicated by the dotted lines in Fig. 4, that is, along the line AF, the frequency spectra received by the two antennas will be shifted downwardly in a scale of frequencies as indicated by the dotted curves of Fig. 5, and will more closely approach one another. Finally if the bisector of the angle of the two antennas is pointed in a direction AG, which is 90° from a true ground track of the aircraft, the spectra received by the two antennas will undergo a minimum Doppler shift.

Figure 6:
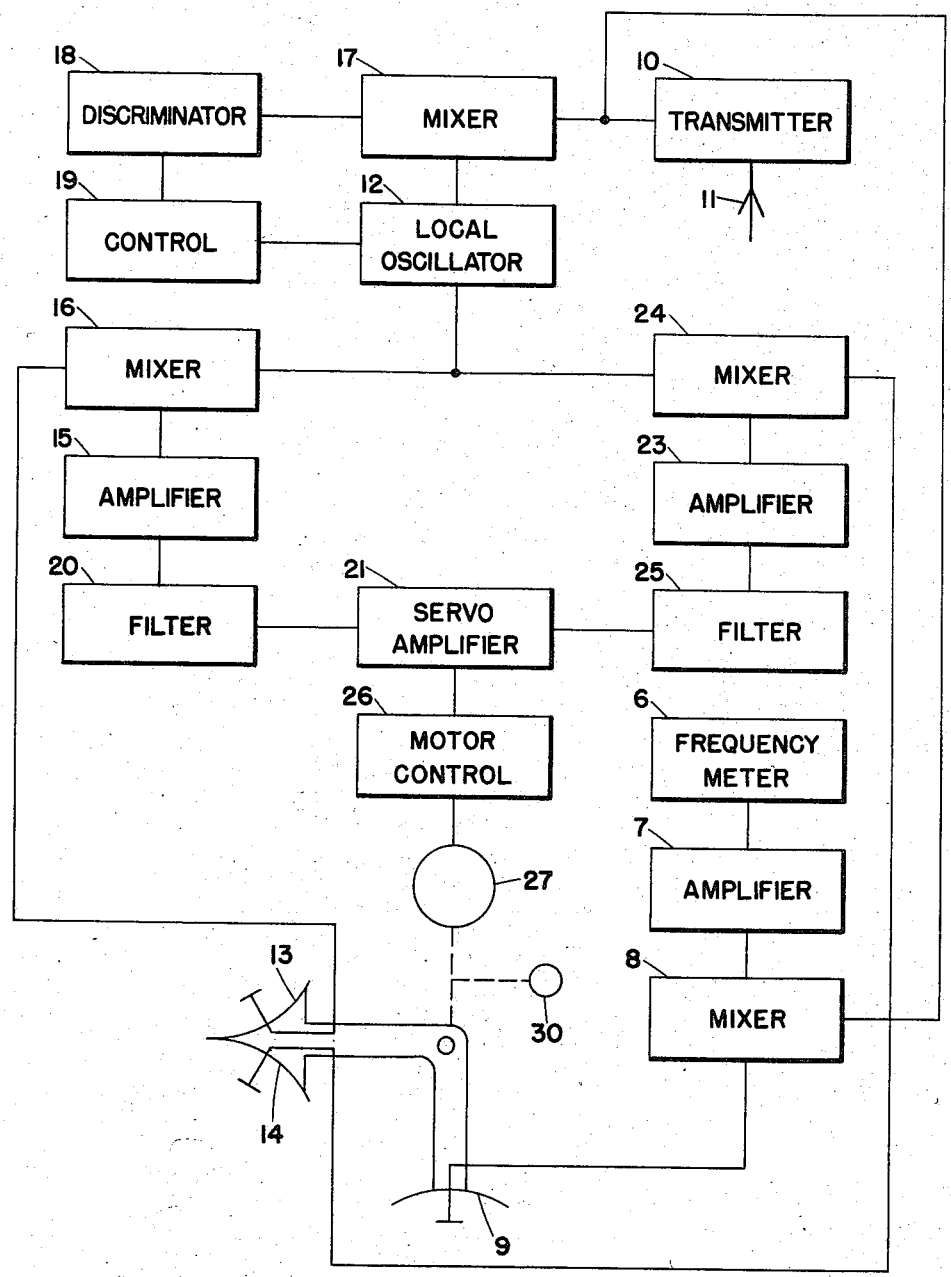
Figure 6 is a block diagram of one form of our invention for indicating direction of travel.

This phenomena is utilized to indicate the true ground track of the aircraft in the following manner:

Referring to Fig. 6, a transmitter 10 is coupled to an antenna 11 which radiates waves over a sufficiently wide area to obtain suitable reflected waves from the earth's surface or other object. The reflected energy of the waves so transmitted is received by directional antennas 9, 13 and 14 all of which are mounted on a single rotatable assembly at a fixed angle with respect to each other. Antennas 13 and 14 are so positioned with respect to each other that their directions of reception are at an acute angle as indicated by the receptivity patterns illustrated in Fig. 4. Antenna 9, on the other hand, is positioned on the rotatable assembly so that its direction of reception is at an angle of 90° with respect to the bisector of the angle between the directions of reception of antennas 13 and 14. By such a positioning of the various receiving antennas when the bisector between the directions of reception of antennas 13 and 14 is made to coincide with a direction 90° from the true ground track of the vehicle in a manner hereinafter described, the direction of reception of antenna 9 will coincide with the true ground track of the vehicle and the spectrum of frequencies received thereby will undergo a maximum of Doppler shift.

The waves received by directional antenna 13 are transmitted to a mixer where they are mixed with waves generated by a local oscillator 12 to obtain difference frequency waves. These difference frequency waves are in turn amplified by an amplifier 15 and transmitted thru a filter 20 to one side of a servo amplifier 21.

The waves received by antenna 14 are transmitted thru a similar circuit consisting of a mixer 24 which mixes the received waves with waves generated by the local oscillator 12 for obtaining difference frequency waves. The difference frequency waves are amplified by amplifier 23 and transmitted thru a filter 25, similar to filter 20, to the other side of the servo amplifier 21.

The servo amplifier 21 compares the voltages of the two waves impressed thereon and the comparison voltage is used to operate motor 27 thru the medium of a motor control 26 to rotate the antenna assembly carrying antennas 9, 13 and 14.

In the system disclosed instead of comparing the received waves with the transmitted wave, the received waves are compared with the waves generated by a local oscillator. It is essential therefore, that the frequency difference between the transmitted wave and the wave generated by the local oscillator be kept constant. This is accomplished by mixing a portion of the transmitted wave and the wave generated by the local oscillator in a mixer 17 and transmitting the difference frequency to a discriminator 18 which functions to control the frequency of the local oscillator 12 thru the medium of an automatic frequency control 19.

Figure 9:
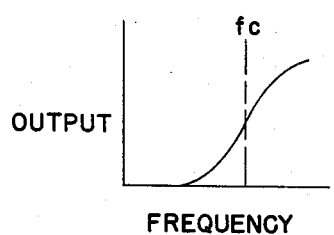
Figure 9 is a curve illustrating the frequency characteristics of the discriminator used in the circuit of Figure 6.

The discriminator 18 may consist of a filter having a characteristic such as is indicated by the curve of Fig. 9 wherein the dotted line $f_c$ represents the difference frequency between the transmitter 10 and local oscillator 12 which is desired to be maintained constant. If the difference frequency tends to assume a value greater than that of the preselected frequency difference $f_c$, the output of the discriminator 18 increases in accordance with the output versus frequency characteristic illustrated in Fig. 9. This increased output is impressed on the control circuit 19 which in turn impresses a variable potential on the grid of the local oscillator 12 to increase the frequency of the wave generated thereby.

On the other hand if the difference frequency tends to assume a value less than that of the preselected frequency difference $f_c$ the output of the discriminator 18 decreases and this decreased output acting thru the control circuit 18 causes a decrease in the frequency of the wave generated by the local oscillator 12.

Other well known types of controls may also be advantageously used, for example, control 19 may be a servo amplifier operative to vary the inductance and/or capacitance of the resonant circuit of the local oscillator 12 on variation of the output of discriminator 18. Whatever control is used the local oscillator 12 is always operated at such a frequency that the frequency difference between the transmitted wave and locally generated wave is maintained constant whether or not there may be a drift in the frequency of the transmitted wave.

Figure 8:
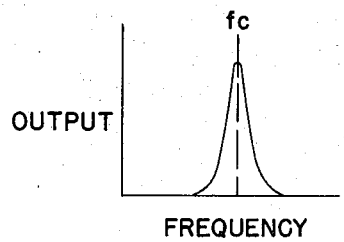
Figure 8 is a curve illustrating frequency characteristics of the filters as used in the circuit of Figure 6.

In the system described, use is made of that portion of the received energy which has the same frequency as the transmitted wave and not the energy which has been shifted in frequency by reason of the Doppler effect. To this end the filters 20 and 25 are sharply selective and as indicated by the characteristic curve of Fig. 8, pass only current of the frequency $f_c$, which as heretofore described is the difference between the frequency of the local oscillator and the frequency of the transmitted wave.

It will be seen therefore, that the filters 20 and 25 function as a means for determining the relative amount of signal received which which has not been subjected to Doppler shift. That is to say, since the difference between the transmitter frequency and the local oscillator frequency is maintained at a constant value $f_c$ by means of the loop network comprising mixer 17, discriminator 18 and control 19, the relative amount of the wave of this preselected frequency which is obtained by beating the received wave and local oscillator wave will determine the amount of signal which is present in the received wave that is of the same frequency as the transmitted wave and therefore, which has suffered no Doppler shift therefrom.

The circuit described operates to determine true drift angle as follows:

Assume that the antenna assembly bearing antennas 9, 13 and 14 is rotated to an angle such that the receptivity patterns of antennas 13 and 14 are represented by the dotted lobe patterns of Fig. 4. In that case the signal received by the antenna having the pattern 2' say, antenna 13, will contain a large amount of signal which contains no Doppler shift of frequencies since a large amount of the signal spectrum received lies along the line AG which is at an angle of 90° with the true ground track of the aircraft. On the other hand, the antenna as represented by the lobe pattern 1', will receive a spectra of frequencies, which contains less of the frequency which has no Doppler shift as is readily apparent from an examination of the relationships depicted in Fig. 4. Under these circumstances, the signals passed by the filters 20 and 25 to the servo amplifier 21 are unbalanced and the motor control 26 is operated to cause motor 27 to rotate in a clockwise direction until the potentials transmitted by filters 20 and 25 are balanced one against the other in the servo amplifier 21.

Under such circumstances as can be readily seen by reference to Fig. 4, the antenna assembly will then be directed at such an angle that the bisector of the angle between the directions of reception of antennas 13 and 14 is at 90° with respect to the true ground track of the vehicle, and through action of servo amplifier 21 motor control 26 and motor 27 the antenna assembly is caused to maintain that angle at all times, regardless of the variation in heading of the vehicle. The true ground track may be indicated to the pilot of the vehicles therefore, by operating an indicator dial such as 30 from the motor shaft which rotates the antenna assembly. The dial 30 serves to indicate the direction of the ground track relative to the heading of the aircraft and hence measures the drift angle which when added to the heading of the aircraft defines the true course thereof.

Having by this means automatically positioned the assembly bearing antennas 9, 13 and 14 so that the bisector of the angle between the directions of reception of antennas 13 and 14 is kept at 90° with respect to the true ground track of the vehicle, the direction of reception of antenna 9 is at the same time made to coincide with the true ground track since the angle between the direction of reception of antenna 9 and the bisector of the angle between the directions of reception of the antennas 13 and 14 is 90°.

The signals received by antenna 9 therefore, will undergo a maximum of Doppler shift as is readily apparent by reference to the graph of Fig. 3.

These signals are transmitted to a mixer 8 where they are combined with signals generated by the transmitter 10. The difference of the received and transmitted signals which in this case constitutes a spectrum of Doppler shift frequencies is amplified by an amplifier 7 and applied to a frequency meter or indicator 6.

This indicator may conveniently be of the type disclosed by F. E. Terman at page 958 of Radio Engineers Handbook, first edition, which produces a direct current output, measurable by ordinary meter means, the value of which is proportional to the frequency of the signal impressed thereon. Since the antenna 9 has been correctly oriented with respect to the true ground track by means of motor 27, the dominant frequency received by the antenna 9 will be the maximum Doppler shifted frequency which when converted to a meter indication by the frequency meter 6 constitutes an indication of the speed of the vehicle in its true direction of movement.

Figure 7:
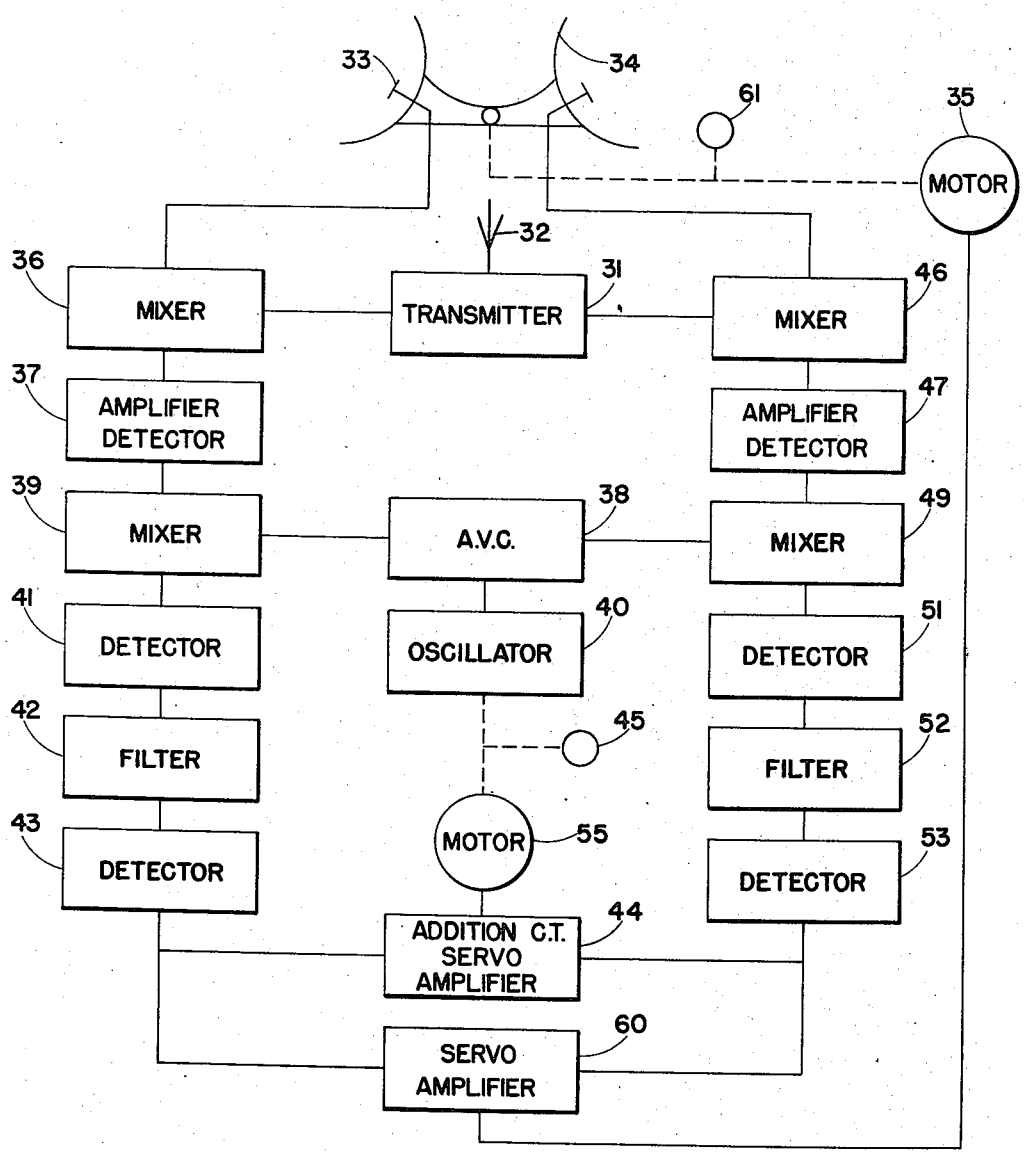
Figure 7 is a block diagram of a modified form of our invention for indicating direction of travel and speed of the vehicle.

In Fig. 7, we have shown a modified system likewise utilizing the Doppler effect which provides a somewhat more accurate indication of vehicle speed.

In this system, as in that of Fig. 6, a transmitter 31 is connected to an antenna 32 to transmit a wave of a suitable pattern to permit reflection from at least a plurality of directions. The wave so transmitted and reflected from the earth's surface is received by two directional antennas 33 and 34, mounted on an assembly to be rotated by a motor 35. As in the case of the system disclosed in Fig. 6, the antennas 33 and 34 have a fixed angular relationship with respect to each other. Reflected signal received at antenna 33 is fed to a mixer 36 where it is mixed with a portion of the signal generated by the transmitter 31. The beat signal so obtained, is amplified and detected in the amplifier and detector 37 and this signal is in turn mixed with a portion of the signal generated by oscillator 40 in mixer 39, the amplitude of the signal transmitted from oscillator 40 to mixer 39 being limited by the automatic volume control circuit 38. The beat signal so obtained, is rectified in detector 41 and transmitted through filter 42 where it is converted to direct current potential by detector 43. This direct current potential is in turn transmitted to one side of an addition circuit and servo amplifier 44.

The signal received by antenna 34 is transmitted through a similar network consisting of mixer 46, amplifier detector 47, mixer 49, detector 51, filter 52 and detector 53 from whence it is fed to the other side of the addition circuit and servo amplifier 44. The two direct current potentials obtained through the networks above described are added in the addition circuit 44 and compared with a reference voltage $V_r$ (see Fig. 10) and the resultant utilized by the servo amplifier to operate a motor 55, which is connected to operate the oscillator 40.

The oscillator 40 may be of any type which generates a wave of a frequency higher in value than the maximum of Doppler shifted frequencies and proportional to the speed of the motor 55.

In this system it is contemplated that the bisector of the angle between the receiving antennas 33 and 34 will be caused to closely approximate the direction of ground track of the aircraft. By reference to the curve of Fig. 3 therefore, it will be seen that in such instances the signals received by the directional receiving antennas will contain a large portion of the maximum of Doppler shifted frequencies. Inasmuch as amplifier detectors 37 and 47 transmit a beat signal whose frequency is the difference of frequency of the transmitter wave and frequency of the reflected received wave, the frequency of this beat signal appearing in the output of these amplifier detectors and fed to the mixers 39 and 49 will constitute the spectra of the Doppler shifted frequency. These Doppler shifted frequency spectra are in turn mixed with the frequency derived from the oscillator 40 and a difference frequency fed to the detectors 41 and 51 and the resultant transmitted through filters 42 and 52.

Figure 10:
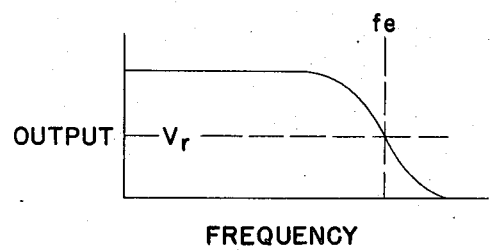
Figure 10 is a curve illustrating the frequency characteristics of the filter used in the circuit of Figure 7.

These filters are of the low band pass type and have characteristics such as are illustrated by the curve of Fig. 10 wherein the upper cut-off frequency is represented by the value $f_e$.

Since these filters have a fixed cut-off at a frequency $f_e$ it will be apparent that before any current may be passed by either of these filters, the difference in the frequency generated by the oscillator 40 and the Doppler shift frequency spectra which constitutes the output of detectors 37 and 47 must be equal to or less than that constant frequency, namely, $f_e$. Assume for example, that the motor 55 is running at too low a speed and that hence, the frequency generated by oscillator 40 is low. The frequency difference between the frequency of oscillator 40 and the Doppler shifted frequencies transmitted to the mixers 39 and 49 will be lower than the frequency $f_e$ and a potential higher than reference potential $V_r$ will be transmitted through the filters 42 and 52 and hence through the detectors 43 and 53 to the addition circuit and servo amplifier 44 and the motor 55 through action of the servo amplifier is caused to increase in speed, increasing the frequency of the wave generated by oscillator 40. This frequency continues to increase until the difference between the oscillator frequency and the Doppler shifted frequencies just passes sufficient potential of value equal to $f_e$ through filters 42 and 52 to maintain a state of balance between these potentials and the reference potential $V_r$. The balance of these potentials in the servo amplifier thereupon causes motor 55 to operate uniformly at its then speed.

It will be seen therefore, that at all times the motor 55 is caused to rotate at a speed which is proportional to the maximum Doppler shift of the signal received by the antennas 33 and 34 and that hence the speed for this motor is an indication of the frequency of such maximum Doppler shift and therefore an indication of the speed of the vehicle. The speed of the motor 55 and hence the speed of the vehicle may be visually indicated by a suitably calbrated device such as a tachometer 45.

If the bisector of the angle between the two receiving antennas is not pointed in the true direction of the ground track, of course, the maximum Doppler shifted frequencies present in the output of detectors 37 and 47 will not be a measure of the true speed of the aircraft along such ground track.

However, since the output of the detectors 43 and 53 are caused to be a measure of maximum Doppler shift by means of filters 42 and 52, a means is provided for assuring that the antenna assembly is at all times directed in the direction of the ground track of the aircraft.

The outputs of detectors 43 and 53 are connected to opposite sides of a servo amplifier 60 and this servo amplifier is used to control a motor 35 which in turn rotates the antenna assembly carrying the antenna 33 and 34. If these directional antennas are not pointed along the ground track, but are pointed in a direction as indicated by the solid line lobes of Fig. 4, the antenna indicated by lobe 1, say antenna 33 being more nearly on the line of the ground track receives a frequency spectra which contains more of the maximum Doppler shifted frequencies than the antenna which is represented by lobe 2, say antenna 34. In such an instance, the output of detector 43 through action of filter 42 is greater than the output of detector 53. By comparing these two currents in the servo amplifier 60, the servo amplifier may be made to operate motor 35 at a speed and in a direction depending on the unbalance of such currents. In the example given, the motor would be caused to operate so that the antenna assembly is rotated in a counterclockwise direction until the bisector of the lobe patterns for the two receiving antennas coincide with the true ground track of the aircraft. When this has occurred, the output of detectors 43 and 53 would be balanced and the antenna assembly would point in the direction of ground track. An indicator such as 61 may be therefore connected to the motor shaft to indicate true ground track at all times, in the same manner as does the indicator 30 in the system of Fig. 6.

Figure 11:
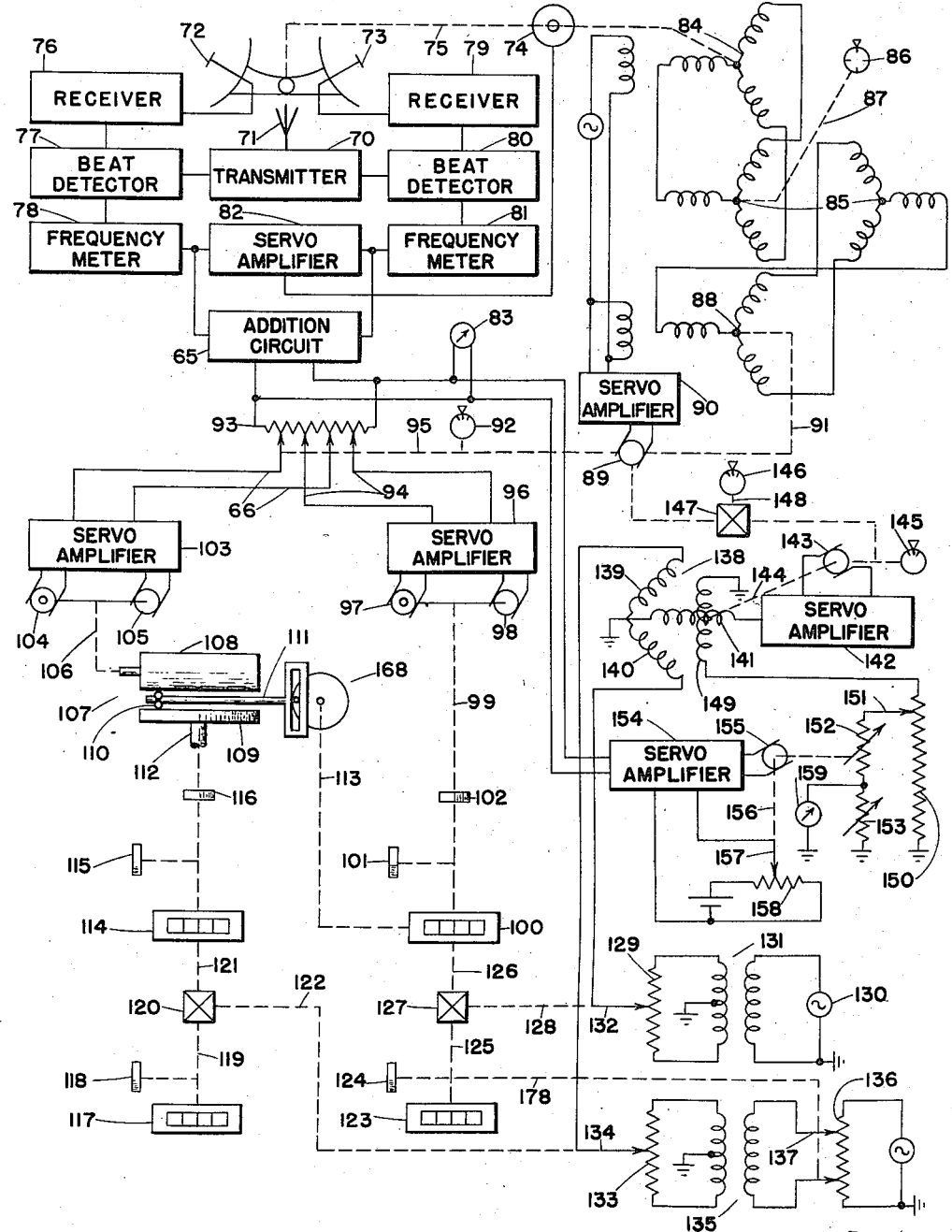
Figure 11 is a diagrammatic representation of still another form of our invention, incorporating means to indicate present position, course to destination and estimated time to reach such destination.

In Fig. 11, there is disclosed a modified system for obtaining drift angle and speed of the moving vehicle, wherein additional means are provided to directly indicate present longitude and latitude and means are also provided to indicate the time necessary to reach a selected destination, the course to be followed to reach such destination and the angle thru which the vehicle must be turned to bear on a selected course.

A transmitter 70 is coupled to an antenna 71 which radiates the signal wave in a suitable pattern to permit reflection from at least a plurality of directions. The signal so transmitted is reflected from the surface of the earth and is received on a pair of directional antennas 72 and 73, mounted on an assembly at a fixed angle with respect to each other. The assembly consisting of the two directional antennas however, may be rotated as a whole about a vertical axis by the motor 74 thru the medium of shaft 75.

The signal received on directional antenna 72 is amplified by the receiver 76 and this amplified signal is mixed with the signal of the transmitter 70 in a beat detector 77 and the difference frequency of these two signals which corresponds to the spectrum of Doppler frequencies is transmitted to a frequency meter 78.

This frequency meter may be of the type disclosed on page 958 of Radio Engineers Handbook, first edition, by F. E. Terman. A frequency meter of this type produces a direct current output, the value of which is proportional to the frequency of the signal impressed thereon. There is obtained therefore, from the output of the frequency meter 78, a direct current which is a measure of the frequency of the Doppler frequency impressed on the frequency meter 78 by the beat detector 77.

A similar system is provided for the signal received on directional antenna 73 which system includes receiver 79, beat detector 80 and frequency meter 81.

The direct current outputs derived from the frequency meters 78 and 81 are impressed upon a servo amplifier 82 and thru action of this servo amplifier, the differences of the direct currents impressed thereon are used to control the speed and direction of the motor 74. It will be seen therefore, that an action similar to that described with reference to Fig. 7, is obtained by means of this circuit. That is to say, if the bisector of the antenna assembly containing directional antennas 72 and 73 is pointing off the true ground track, the spectra of Doppler frequencies received by one of the directional antennas will contain frequencies which are higher than those received by the other. Inasmuch as the frequency meters 78 and 81 produce a direct current output which is proportional to the frequency of the wave impressed on their inputs, that frequency meter which is connected in the antenna circuit containing the higher Doppler frequencies will have a greater direct current output. This unbalance of direct current output impressed on the input of the servo amplifier 82 results thru action thereof in an output potential which when impressed on the motor 74 will cause the motor to rotate in one direction or another, depending which of the frequency meters 78 or 81 produces the greatest direct current output relative to the other. The motor, and hence the antenna assembly carrying antennas 72 and 73 will continue to rotate until the direct current outputs of the frequency meters 78 and 81 are equal and hence balanced in the servo amplifier 82. When this occurs the antenna assembly must necessarily have been rotated so that the Doppler spectra of frequencies received by antennas 72 and 73 are equal. This can only occur, however, when the bisector of the antenna assembly is pointing along the true ground track corresponding to the line AB of Fig. 4. Since regardless of the heading of the vehicle the motor 74 is always rotated until the bisector of the antenna assembly points in the direction of true ground track, the amount of angular rotation of the shaft 75 of the motor 74 constitutes an indication of the drift angle of the vehicle.

Since the direct current outputs of frequency meters 78 and 81 are proportional to the Doppler spectra of frequencies and hence the speed of the vehicle, a means is also provided for directly indicating such speed. These direct current outputs may be added in an addition circuit 65 and the resultant addition impressed on a suitably calibrated meter 83 which will then read speed directly.

By this system therefore, there has been obtained a voltage which is proportional to speed and a shaft rotation which is a measure of drift angle of the vehicle. These two indicia may be used to directly indicate the present position of the vehicle in latitude and longitude in the following manner:

The shaft 75 of the motor 74 is connected to the rotary element of a synchro transmitter 84 and hence there is obtained, in the output of the synchro transmitter, voltages which vary in phase and amplitude in accordance with such shaft position, namely, drift angle. These voltages are impressed on a differential synchro 85 and the rotor of this differential synchro is in turn rotated in accordance with the compass bearing by means of the compass card 86 and shaft 87. The output of the differential synchro therefore, constitutes voltages which vary in phase and amplitude in accordance with the algebraic sum of the compass bearing and drift angle, which sum is the true course of the vehicle. These voltages are converted to a shaft rotation by being impressed on the synchro receiver 88, the rotor of which rotates the motor 89 thru a servo loop consisting of the amplifier 90 and shaft 91. The shaft 91 therefore, assumes an angle which is a measure of true ground track of the vehicle and this may be indicated on a suitably calibrated dial 92.

In addition to a shaft rotation which is the measure of the true angle of ground track there has also been obtained as heretofore indicated, a voltage which is a measure of the speed of the vehicle in the direction of such ground track.

This voltage may be converted to two voltages which are measures respectively of the speed of the vehicle in an east-west direction and a speed of the vehicle in a north-south direction. To accomplish such conversion a sine potentiometer 93 is connected across the output terminals of the addition circuit 65 so that the voltage which is a measure of the speed of the vehicle in the direction of its true course is impressed across this sine potentiometer as well as across speed indicator 83. The movable pairs of contacts 66, 94 of this potentiometer are rotated in accordance with the true angle of travel of the vehicle thru the medium of shaft 95 connected to shaft 91. There is obtained therefore, between one pair of the movable contacts 94 of the potentiometer, a voltage which is proportional to the speed of the vehicle multiplied by the sine of the angle of true ground track of the vehicle, that is to say, the speed of the vehicle in a north-south direction. Similarly a voltage is obtained between the other pair of movable contacts 66 of the sine potentiometer which is proportional to the speed of the vehicle, multiplied by the cosine of its true ground track angle, that is to say, a voltage which is proportional to the speed of the vehicle in its east-west direction.

The voltage obtained from the sine potentiometer 93 which is proportional to the speed in the north-south direction is impressed on a servo amplifier 96 and this voltage by means of a servo loop consisting of the servo amplifier 96, a motor 97 and an error feedback generator 98 rotates shaft 99 at a speed which is proportional to the speed in the north-south direction. This shaft may in turn be used to operate a suitably calibrated counter 100 which will at all times indicate the latitude of the vehicle if before the start of the journey the dials thereof have been preset to read the latitude of the starting point. In order that this counter may be properly set in the first instance and re-set at any time, a manual knob 101 and a slip clutch 102 is provided, attached to the shaft 99 so that the counter 100 may be re-set, at any time independently of the movement of the shaft 99.

The voltage which is proportional to the speed of the vehicle in an east-west direction, is converted to shaft rotation in a similar manner thru the medium of servo amplifier 103, motor 104 and generator 105, whereby the shaft 106 has a speed of rotation which is proportional to the speed of the vehicle in its east-west direction. This shaft however, may not be used to directly operate a counter to obtain an indication of longitude for the reason that variation in longitude on the earth's surface varies as a function of the cosine of the latitude by reason of the convergence of the lines of longitude as they approach the poles of the earth. In order to obtain an indication of longitude therefore, there must be introduced a correction depending on the present latitude of the vehicle.

This is accomplished by the ball disc integrator 103 and scotch yoke 168. The ball disc integrator 107 consists of a cylinder 108 which is rotated by the shaft 106. Rotation of the cylinder 108 is transmitted to a circular disc 109 thru the medium of a ball cage 110 which ball cage may be varied in its radial position on the disc 109 by longitudinal movement of the shaft 111 carrying the ball cage 110 and the ball transmission elements. It will be apparent that when the ball cage 110 is positioned near the periphery of the disc 109 its shaft 112 is rotated at its slowest speed. On the other hand, when thru lateral movement of the shaft 111, the ball cage 110 is positioned near the rotational center of disc 109, the shaft 112 will be rotated at extremely high speed.

The ball cage 110 is positioned radially on the disc 109 in accordance with the cosine of the latitude by means of the scotch yoke 168 which is operated by shaft 113 rotating in accordance with the latitude of the vehicle by action of the latitude counter 100. This mechanism therefore, introduces a correction into the measurement of speed in an east-west direction which is proportional to the reciprocal of the cosine or the secant of the present latitude and therefore, the shaft 112 rotates at a speed which is proportional to the change of longitude of the vehicle regardless of its latitude. Longitude may therefore be indicated on a counter 114 which is similar to the counter 100, used in indicating latitude. As in the case of the latitude indicator, a manual knob 115 and slip clutch 116 is provided to re-set the longitude indicator to its proper initial value.

If the indicators 100 and 114 are properly set when the vehicle begins its journey, that is, so set that they indicate the latitude and longitude of the vehicle at its starting point, these indicators will continually change in indication as the vehicle proceeds on its journey and will at all times indicate the position of the vehicle on the surface of the earth directly in terms of latitude and longitude.

If it is also desired to indicate the direction of the course to a selected destination, the time it will take to reach that destination and the angle the vehicle should be turned to follow the true course, the following mechanism may additionally be incorporated. An indicator 117 similar to indicator 114, is manually set to read the longitude of the destination by manual control 118. The rotation necessary for this is transmitted thru shaft 119 to a differential 120, which in turn is rotated by a shaft 121 operated by the present longitude indicator 114. The output shaft 122 of the differential 120 therefore rotates by an amount which is the difference between the present longitude and longitude of the destination.

By a similar mechanism consisting of indicator 123, indicating latitude of destination, manual control 124, shaft 125, shaft 126 and differential 127, an output may be produced on shaft 128 which is the difference between the present latitude and the latitude of destination.

The rotation of shaft 128 which is proportional to the difference between present latitude and latitude of destination, may be converted to a voltage which is proportional to the same difference thru the medium of potentiometer 129. This potentiometer is supplied with an alternating potential by means of the alternating current source 130 and transformer 131. The movable contact 132 of the potentiometer 129 is varied in its position of contact with the potentiometer 129 by means of the shaft 128. The potential impressed across a circuit consisting of such movable contact 132 and ground, therefore, is a measure of the north-south distance to be traveled by the vehicle in reaching its destination.

In a similar manner, a voltage proportional to the distance to be traveled by the vehicle in an east-west direction may be obtained by use of potentiometer 133 and movable contact 134. However, here again a difference in longitude may not be directly converted into distance in an east-west direction, since distance in an east-west direction is a function of the cosine of the latitude. To accomplish this conversion, the alternating current supply fed to the potentiometer 133 thru transformer 135 is obtained thru the medium of a cosine potentiometer 136, the movable contacts 137 of which are varied in accordance with the latitude of the destination thru the operation of shaft 178.

The corrective factor introduced by use of shaft 178 determines the kind of course to be followed in reaching the destination. Shaft 178 can be connected to either shaft 126 or 125 or a manually adjusted shaft depending upon the type of course desired. In any case the craft will be guided on a course which terminates at the predetermined destination.

There is obtained therefore between movable contact 134 and ground and movable contact 132 and ground two voltages, one of which is proportional to the distance to be traveled in an east-west direction and the other of which is proportional to the distance to be traveled in a north-south direction. These voltages may be vectorially added in the resolver 138 by connecting movable contacts 132 and 134 to opposite ends of coils 139 and 140. The rotor 141 is rotated to the null point by means of a servo loop consisting of the servo amplifier 142, motor 143 and shaft 144 connecting the motor and the movable coil 141. When the coil 141 has been rotated to this null position by means of the servo loop, the angular position of shaft 144 is an indication of the direction of the course which should be traveled in going from present location in order to reach the final destination. This angle may be indicated by a properly calibrated dial 145 operated from shaft 144.

There has also been indicated as previously described, the direction of travel of the vehicle by the angular movement of shaft 91 connected to operate indicator 92. It may well be that thru error the direction of travel of the vehicle does not coincide with the direction in which the vehicle must proceed to reach its destination. The difference in these angles and hence the angle thru which the craft must be turned to be properly directed on its course, may be indicated on a suitably calibrated dial 146 by subtracting the angular motions of shafts 91 and 144 by means of a differential 147, the difference in such shaft rotations constituting the difference in the input of the differential and is transmitted to the dial 146 by means of shaft 148.

At the same time that movable coil 141 of the resolver 138 is moved to the null position, indicating the direction of the course from present position to the final destination, the voltages representative of east-west and north-south distance to be traveled, are vectorially added in movable coil 149, giving a voltage whose value is the vector sum of the east-west and north-south distance voltages and hence is a function of the distance to be traveled from present position to final destination.

As has been described heretofore, there has also been produced in the output of the servo amplifier 65 a voltage whose value is representative of the speed of the vehicle. If then the voltage which is representative of the distance to be traveled and which is referred to hereinafter as $V_1$, is divided by the voltage which is representative of the speed of the vehicle and is hereinafter referred to as $V_2$, the time necessary to reach destination may be indicated and by reference to the present time, the estimated time of arrival may be determined.

The voltages $V_1$ and $V_2$ may be divided in the following manner: The voltage $V_1$ is impressed across the potentiometer 150 and the movable contact 151 of this potentiometer is connected to variable resistors 152 and 153 in such fashion that the series circuit consisting of these variable resistors is conected across a portion of potentiometer 150 and ground. The voltage $V_2$ from the addition circuit 65 which is representative of present speed of the vehicle is converted to a shaft rotation and used to vary the resistance of resistor 152 by means of a servo amplifier 154 and motor 155. To correct for any error in the positioning of the motor 155, an error feedback is provided by connecting the shaft 156 to the motor and movable contact 157 of potentiometer 158 to thereby impress an error voltage on the servo amplifier 154 in such a manner that the shaft of the motor 155 is always brought to the correct angular position.

Considering the network consisting of potentiometer 150, variable resistance 152 and variable resistance 153, the following voltage relationships obtain:

$$V_3 = V_4 \frac{R_1}{R_1 + R_2} \quad (1)$$

where $V_3$ is the voltage drop across variable resistor 153, $V_4$ is the voltage drop across the series circuit consisting of variable resistors 152 and 153, $R_1$ is the resistance of variable resistor 153 and $R_2$ is the resistance of variable resistor 152.

The voltage $V_4$ impressed across the series connection of resistors 152 and 153 is some fraction of the voltage $V_1$ impressed across potentiometer 150, since the voltage $V_4$ is derived from that portion of the potentiometer which is connected between the movable contact 151 and ground. $V_4$ may be therefore, expressed in terms of $V_1$ as $$V_4 = \frac{V_1}{A} \quad (2)$$

where A is a constant for any particular setting of contact 151.

Since the resistance $R_2$ of resistor 152 is varied in accordance with voltage $V_2$ by action of the servo amplifier 154 and motor 155, resistance $R_2$ may therefore be expressed in terms of voltage $V_2$ by the following equation:

$$R_2 = K(V_2 - V_c) = KV_2 - KV_c \quad (3)$$

where K is a constant and $V_c$ is a constant voltage representative of the lower limit of ground speed to which it is desired to operate and is the voltage applied at the input to servo 154 when the resistor 152 is reduced to its minimum value of resistance. Substituting the values obtained from Equation 3 into Equation 1, the following is obtained:

$$V_3 = V_4 \frac{R_1}{R_1 + KV_2 - KV_c} \quad (4)$$

If now the variable resistor 153 is adjusted so that its value $R_1$ is equal to $KV_c$, Equation 4 becomes:

$$V_3 = V_4 \frac{KV_c}{KV_c + KV_2 - KV_c} = V_4 \frac{V_c}{V_2} \quad (5)$$

Again, if the movable contact 151 of potentiometer 150 is adjusted so that the constant A is equal to $kV_c$ from Equation 2 there is obtained:

$$kV_4 = \frac{V_1}{V_c} \quad (6)$$

and substituting this value in Equation 5, the following relationship is obtained:

$$kV_3 = \frac{V_1 V_c}{V_2 V_c} = \frac{V_1}{V_2} \quad (7)$$

As heretofore stated, the voltage $V_1$ divided by the voltage $V_2$ is a measure of the time for the vehicle to travel from its present position to the point of predetermined destination and this time may be indicated thru the use of the desired proportionality constant $k$ on a suitable meter 159, connected across the variable resistor 153 to measure the voltage $V_3$ of the above equation.

While we have described apparatus for indicating present latitude and present longitude, the course to be traveled to reach destination, the angle to turn to follow such course and the estimated time which will be necessary to reach the destination in connection with the particular system, for determining speed and drift angle as illustrated in Fig. 11, it will be apparent that these devices may be connected to any system which indicates drift angle by angular position of a shaft and speed by the value of a direct current voltage. This apparatus for example, may be utilized in connection with the system of Fig. 7 wherein the drift angle is derived from the shaft of motor 35 and the voltage representative of speed is derived from the servo amplifier 44.

While in describing the above systems we have referred to two separate receiving antennas which receive the reflected signal waves from two different directions simultaneously, we also contemplate using a single antenna which is rapidly switched from one receiving direction to the other.

Likewise it will be readily apparent that the systems disclosed are not limited in their utility to any particular frequency of transmitted wave. For example, transmission frequencies may be sonic, ultrasonic or radio frequency regions although it is our preference to use ultrasonic or microwave frequencies.

What is claimed is:

1. In a navigation system, means for transmitting a signal wave from a moving body, means for receiving on said body a spectrum of waves reflected from the earth's surface in one direction, means for receiving on said body a spectrum of waves reflected from the earth's surface in another direction, a local oscillator on said body generating a second signal wave, means for beating said reflected spectra with the second signal wave produced by said local oscillator to produce heat frequency spectra, means for discriminating against all but a selected beat frequency which is the difference of the transmitted wave and the frequency of the local oscillator wave and means operative by a comparison of the amount of energy of said selected beat frequencies to determine true direction of travel.

2. In a navigation system, means for transmitting a wave from a moving body, means for receiving on said body a spectrum of waves reflected from the earth's surface in one direction, means for receiving on said body a spectrum of waves reflected from the earth's surface in another direction, means for beating said reflected waves with said transmitted wave to produce two beat frequency spectra, means for discriminating against all but a selected portion of the beat frequency of said spectra, means operable by said selected portion of the beat frequency for determining velocity of said body and means operable by a comparison of the energy of the selected portion of the beat frequency of said two beat frequency spectra to indicate true direction of travel.

3. In a navigation system, means for transmitting a wave from a moving vehicle, means on said vehicle for receiving a spectrum of waves reflected from the earth's surface in one direction, means on said vehicle for receiving a spectrum of waves reflected from the earth's surface in another direction, means for beating the reflected waves so received with said transmitted wave to produce two separate beat frequency spectra, means for generating a local wave having a frequency which is a function of the frequency of said beat frequency spectra, means operable in accordance with the frequency of said local wave for indicating the speed of said vehicle, means operable by a comparison of said beat frequency spectra for indicating true direction of travel of said vehicle, and means operable by said speed indicating means and said direction indicating means to indicate the position of said vehicle on the earth's surface.

4. In a navigation system, means for transmitting a wave from a moving vehicle, means on said vehicle for receiving a spectrum of waves reflected from the earth's surface in one direction, means on said vehicle for receiving a spectrum of waves reflected from the earth's surface in another direction, means for beating the reflected waves so received with said transmitted wave to produce two separate beat frequency spectra, means for generating a local wave having a frequency which is a function of the frequency of said beat frequency spectra, means operable in accordance with the frequency of said local wave for indicating the speed of said vehicle, means operable by a comparison of said beat frequency spectra for indicating true direction of travel of said vehicle, means operable by said speed indicating means and said direction indicating means for indicating the position of said vehicle on the earth's surface and further means operable by said position indicating means and said speed indicating means for indicating course to and time of arrival at a selected destination.

5. In a navigation system, a transmitter, an antenna connected thereto for transmitting the signal wave generated by said transmitter, means for receiving a spectrum of signal waves reflected from a first direction, means for receiving a spectrum of signal waves reflected from a second direction, a local oscillator, means for maintaining the frequency of the wave generated by said local oscillator at a constant difference with the wave generated by said transmitter, means for beating the signal received from said first direction with the signal wave generated by said local oscillator to provide a first beat frequency spectrum, means for beating the signal received from said second direction with the signal wave generated by said local oscillator to provide a second beat frequency spectrum, a first filter means for discriminating against all frequencies of said first beat frequency spectrum except that which is represented by the constant difference of said local oscillator signal wave and said transmitter signal wave, a second filter means for discriminating against all frequencies of said second beat frequency spectrum except that which is represented by the constant difference of said local oscillator signal wave and said transmitter signal wave, means for comparing the energy outputs of said first and second filter means and means operative in accordance with such comparison for indicating direction of travel.

6. In a navigation system, a transmitter, an antenna connected thereto for transmitting a signal wave generated by said transmitter, a first directional receiving antenna, a second directional receiving antenna mounted on an antenna assembly at a fixed angle with respect to said first directional receiving antenna, a local oscillator, means for maintaining the frequency of the wave generated by said local oscillator at a constant difference with the wave generated by said transmitter, means for beating the signal wave received by said first directional antenna with the signal wave generated by said local oscillator to provide a first spectrum of beat frequencies, means for beating the signal wave received by said second directional antenna with the signal wave generated by said local oscillator to provide a second spectrum of beat frequencies, a first filter means for discriminating against all frequencies of said first beat frequency spectrum except that which is represented by the constant difference of said local oscillator signal wave and said transmitter signal wave, a second filter means for discriminating against all frequencies of said second beat frequency spectrum except that which is represented by the constant difference of said local oscillator signal wave and said transmitter signal wave, means for comparing the energy outputs of said first filter means and said second filter means, means operative by the comparison means for rotating said antenna assembly and indicator means connected thereto for indicating direction of travel.

7. In a navigation system, a transmitter, an antenna connected thereto for transmitting the signal generated by said transmitter, means for receiving transmitted signals reflected from a first direction, means for receiving transmitted signals reflected from a second direction, means for beating the signals received from said first direction with a portion of the signal wave generated by said transmitter to produce a first spectrum of beat frequencies, a local oscillator, means for beating a portion of the signal wave generated by said local oscillator with said first beat frequency spectrum to produce a second beat frequency spectrum, filter means for discriminating against all but a portion of said second beat frequency spectrum, means for beating the signal wave received from said second direction with a portion of the signal wave generated by said transmitter to produce a third spectrum of beat frequencies, means for beating a portion of the signal wave generated by said local oscillator with said third beat frequency spectrum to produce a fourth beat frequency spectrum, filter means for discriminating against all but a portion of said fourth beat frequency spectrum, and means operative by the energy outputs of said first and second mentioned filters for controlling the frequency of the signal wave generated by said local oscillator and for indicating speed.

8. In a navigation system, a transmitter, an antenna connected thereto for transmitting the signal generated by said transmitter, means for receiving transmitted signals reflected from a first direction, means for receiving transmitted signals reflected from a second direction, means for beating the signals received from said first direction with a portion of the signal wave generated by said transmitter to produce a first spectrum of beat frequencies, a local oscillator, means for beating a portion of the signal wave generated by said local oscillator with said first beat frequency spectrum to produce a second beat frequency spectrum, filter means for discriminating against all but a portion of said second beat frequency spectrum, means for beating the signal wave received from said second direction with a portion of the signal wave generated by said transmitter to produce a third spectrum of beat frequencies, means for beating a portion of the signal wave generated by said local oscillator with said third beat frequency spectrum to produce a fourth beat frequency spectrum, filter means for discriminating against all but a portion of said fourth beat frequency spectrum, and means operative by the energy outputs of said first and second mentioned filters for controlling the frequency of the signal wave generated by said local oscillator and for indicating speed, and further means operative by a comparison of the relative outputs, of said first and second mentioned filters for indicating direction of travel.

9. In a navigation system, a transmitter, an antenna connected thereto for transmitting the signal wave generated by said transmitter, a first directional receiving antenna, a second directional receiving antenna, said first and second receiving antennas being mounted on a rotatable antenna assembly at a fixed angle with respect to each other, means for beating the signals received by said first directional antenna with a portion of the signal wave generated by said transmitter to produce a first spectrum of beat frequencies, a local oscillator, means for beating a portion of the signal wave generated by said local oscillator with said first beat frequency spectrum to produce a second beat frequency spectrum, filter means for discriminating against all but a portion of said second beat frequency spectrum, means for beating the signals received by said second directional antenna with a portion of the signal wave generated by said transmitter to produce a third spectrum of beat frequencies, means for beating a portion of the signal wave generated by said local oscillator with said third beat frequency spectrum to produce a fourth beat frequency spectrum, filter means for discriminating against all but a portion of said fourth beat frequency spectrum, and means operative by the energy outputs of said first and second mentioned filters for controlling the frequency of the signal wave generated by said local oscillator and for indicating speed.

10. In a navigation system, a transmitter, an antenna connected thereto for transmitting the signal wave generated by said transmitter, a first directional receiving antenna, a second directional receiving antenna, said first and second receiving antennas being mounted on a rotatable antenna assembly at a fixed angle with respect to each other, means for beating the signals received by said first directional antenna with a portion of the signal wave generated by said transmitter to produce a first spectrum of beat frequencies, a local oscillator, means for beating a portion of the signal wave generated by said local oscillator with said first beat frequency spectrum to produce a second beat frequency spectrum, filter means for discriminating against all but a portion of said second beat frequency spectrum, means for beating the signals received by said second directional antenna with a portion of the signal wave generated by said transmitter to produce a third spectrum of beat frequencies, means for beating a portion of the signal wave generated by said local oscillator with said third beat frequency spectrum to produce a fourth beat frequency spectrum, filter means for discriminating against all but a portion of said fourth beat frequency spectrum, and means operative by the energy output of said first and second mentioned filters for controlling the frequency of the signal wave generated by said local oscillator, and further means operative by a comparison of the relative outputs of said first and second mentioned filters for controlling the amount of rotation of said antenna assembly.

11. In a navigation system, means for producing a voltage proportional to the speed of a vehicle, means for positioning a shaft in accordance with the direction of travel of said vehicle, means operative by said voltage producing means and said positioning means for producing a first voltage which is a measure of the speed of said vehicle in a north-south direction and a second voltage which is a measure of the speed of said vehicle in an east-west direction, indicator means operative by said first voltage to indicate present latitude, and means operative by said second voltage and by said latitude indicating means to indicate present longitude.

12. In a navigation system, means for producing a voltage proportional to the speed of a vehicle, means for positioning a shaft in accordance with the direction of travel of said vehicle, means operative by said voltage producing means and said shaft positioning means for producing a first voltage which is a measure of the speed of said vehicle in a north-south direction and a second voltage which is a measure of the speed of said vehicle in an east-west direction, indicator means operative by said first voltage to indicate present latitude, means operative by said second voltage and by said latitude indicating means to indicate present longitude, means for indicating latitude of destination, means for indicating longitude of destination, means operative by said present latitude indicator and said destination latitude indicator for producing a voltage representative of the distance to be traveled in a north-south direction, means operative by said present longitude indicator, said destination longitude indicator and a selected latitude for producing a voltage representative of the distance to be traveled in an east-west direction, means for vectorally adding said north-south and east-west distance representaitve voltages to obtain a voltage representative of the distance to be traveled on a course from present location to destination and means for dividing said last named voltage by the voltage proportional to the speed of the vehicle for indicating the time required to reach destination.

13. In a navigation system, means for producing a voltage proportional to the speed of a vehicle, means for positioning a shaft in accordance with the direction of travel of said vehicle, means operative by said voltage producing means and said shaft positioning means for producing a first voltage which is a measure of the speed of said vehicle in a north-south direction and a second voltage which is a measure of the speed of said vehicle in an east-west direction, indicator means operative by said first voltage to indicate present latitude, means operative by said second voltage and by said latitude indicating means to indicate present longitude, means for indicating latitude of destination, means for indicating longitude of destination, means operative by said present latitude indicator and said destination latitude indicator for producing a voltage representative of the distance to be traveled in a north-south direction, means operative by said present longitude indicator, said destination longitude indicator and a selected latitude for producing a voltage representative of the distance to be traveled in an east-west direction, means for vectorally adding said north-south and east-west distance representative voltages to obtain a voltage representative of the distance to be traveled on a course from present location to destination, means for dividing said last named voltage by the voltage proportional to the speed of the vehicle for indicating the time required to reach destination, and means operative by said east-west and north-south distance representative voltages for indicating course from present location to destination.

14. In a navigation system, means for producing a voltage proportional to the speed of a vehicle, means for positioning a shaft in accordance with the direction of travel of said vehicle, means operative by said voltage producing means and said shaft positioning means for producing a first voltage which is a measure of the speed of said vehicle in a north-south direction and a second voltage which is a measure of the speed of said vehicle in an east-west direction, indicator means operative by said first voltage to indicate present latitude, means operative by said second voltage and by said latitude indicating means to indicate present longitude, means for indicating latitude of destination, means for indicating longitude of destination, means operative by said present latitude indicator and said destination latitude indicator for producing a voltage representative of the distance to be traveled in a north-south direction, means operative by said present longitude indicator, said destination longitude indicator and a selected latitude for producing a voltage representative of the distance to be traveled in an east-west direction, means for vectorally adding said north-south and east-west distance representative voltages to obtain a voltage representative of the distance to be traveled on a course from present location to destination, means for dividing said last named voltage by the voltage proportional to the speed of the vehicle for indicating the time required to reach destination, means operative by said east-west and north-south distance representative voltages for indicating course from present location to destination and means operative by said course indicating means and said shaft positioning means for indicating the angle of turn to bring said vehicle on its course.

15. In a navigation system, means located on a moving vehicle for transmitting signals toward the earth's surface, means located on said vehicle for receiving a spectrum of Doppler shifted waves reflected from the earth's surface in a first direction, means located on said vehicle for receiving a spectrum of Doppler shifted waves reflected from the earth's surface in a second direction, a filter for rejecting all but a selected portion of waves representative of the spectrum received from said first direction, a second filter for rejecting all but a selected portion of waves representative of the spectrum received from said second direction, an amplifier, an input circuit therefor on which the output of said first and second filters are differentially impressed, a motor operated by the output of said amplifier connected to simultaneously vary the directions from which the waves are received and indicator means operated by said motor means.

16. In a navigation system, means for transmitting signal waves from a moving vehicle toward the earth's surface, means located on said vehicle for receiving waves reflected from the earth's surface in one direction from said vehicle, means for receiving waves reflected from the earth's surface in another direction from said vehicle, means for obtaining a first spectrum of beat frequencies from the waves reflected from said first direction which is proportional to the speed of said vehicle in said first direction, means for obtaining a second spectrum of beat frequencies from waves reflected from said second direction which is proportional to the speed of said vehicle in said second direction, means for obtaining a first signal whose amplitude varies as a function of the frequency of said first beat frequency spectrum, means for obtaining a second signal whose amplitude varies as a function of said second beat frequency spectrum, comparison means producing an output whose amplitude is representative of the difference between said first and second signals, motor means operated by said comparison means output for simultaneously changing said directions of reception, and indicating means operated by said motor means.

17. In a navigation system, means for transmitting signal waves from a moving vehicle, means for receiving on said vehicle a spectrum of waves reflected from a portion of the earth's surface located in one direction from said vehicle, means for receiving on said vehicle a spectrum of waves reflected from a portion of the earth's surface located in another direction from said vehicle, a local oscillator, means for beating said reflected waves with the waves produced by said local oscillator to produce first and second beat frequency spectra, means for obtaining a first signal whose amplitude varies as a function of the frequency of said first beat frequency spectrum, means for obtaining a second signal whose amplitude varies as a function of said second beat frequency spectrum, comparison means producing an output whose amplitude is representative of the difference between said first and second signals, motor means operated by said comparison means output for simultaneously changing said directions of reception, and indicating means operated by said motor means.

18. In a navigation system, means for transmitting signal waves from a moving vehicle, means for receiving on said vehicle a spectrum of waves reflected from a portion of the earth's surface located in one direction from said vehicle, means for receiving on said vehicle a spectrum of waves reflected from a portion of the earth's surface located in another direction from said vehicle, a local oscillator, means for producing a first beat frequency spectrum from the signal generated by said local oscillator and the spectrum of waves received from said first direction, means for producing a second beat frequency spectrum from the signal generated by said local oscillator and the spectrum of waves received from said second direction, a first band-pass filter having impressed thereon said first beat frequency spectrum, a second band-pass filter having impressed thereon said second beat frequency spectrum, comparison means operated by the portions of the first and second beat frequency spectra transmitted by said first and second filters and a reference signal for varying the frequency of the signal generated by said local oscillator whereby the frequencies of said first and second beat frequency spectra are varied and only predetermined portions thereof are transmitted through said filters, an indicator operated by said local oscillator varying means, means for differentially comparing the energy transmitted by said first and second filters and direction indicating means operated thereby.

19. In a navigation system, means for transmitting signal waves from a moving vehicle, means for receiving on said vehicle a spectrum of waves reflected from a portion of the earth's surface located in one direction from said vehicle, means for receiving on said vehicle a spectrum of waves reflected from a portion of the earth's surface located in another direction from said vehicle, a local oscillator, means for producing a first beat frequency spectrum from the signal generated by said local oscillator and the spectrum of waves received from said first direction, means for producing a second beat frequency spectrum from the signal generated by said local oscillator and the spectrum of waves received from said second direction, a first band-pass filter having impressed thereon said first beat frequency spectrum, a second band-pass filter having impressed thereon said second beat frequency spectrum, a first comparison means operated by the portion of the first and second beat frequency spectra transmitted by said first and second filters and a reference signal for varying the frequency of the signal generated by said local oscillator whereby the frequencies of said first and second beat frequency spectra are varied and only predetermined portions thereof are transmitted through said filters, an indicator operated by said local oscillator varying means, a second comparison means on whose input signals representation of the portion of said first and second beat frequency spectra transmitted by said filters are differentially impressed, motor means operated by the output of said second comparison means simultaneously changing the directions of reception and indicating means operated by said motor means.

References Cited in the file of this patent

UNITED STATES PATENTS

| | | |
|---|---|---|
| 1,864,638 | Chilowski | June 28, 1932 |
| 2,193,361 | Rice | Mar. 12, 1940 |
| 2,223,224 | Newhouse | Nov. 26, 1940 |
| 2,412,003 | Neufeld | Dec. 3, 1946 |
| 2,422,064 | Anderson | June 10, 1947 |
| 2,423,023 | Hershberger | June 24, 1947 |
| 2,426,228 | Mackta | Aug. 25, 1947 |
| 2,435,615 | Varian | Feb. 10, 1948 |
| 2,459,074 | Hastings-Hodgkins | Jan. 11, 1949 |